Sept. 30, 1958
J. B. LONG
2,854,129
POWER DRIVEN CONVEYING MECHANISM
Filed April 26, 1956
2 Sheets-Sheet 1
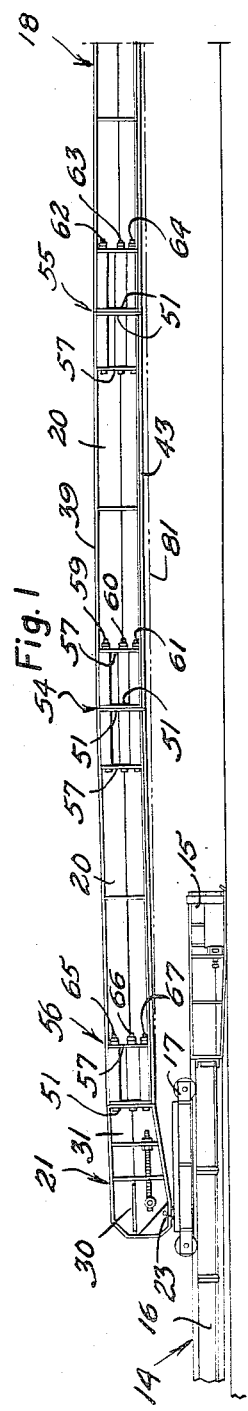
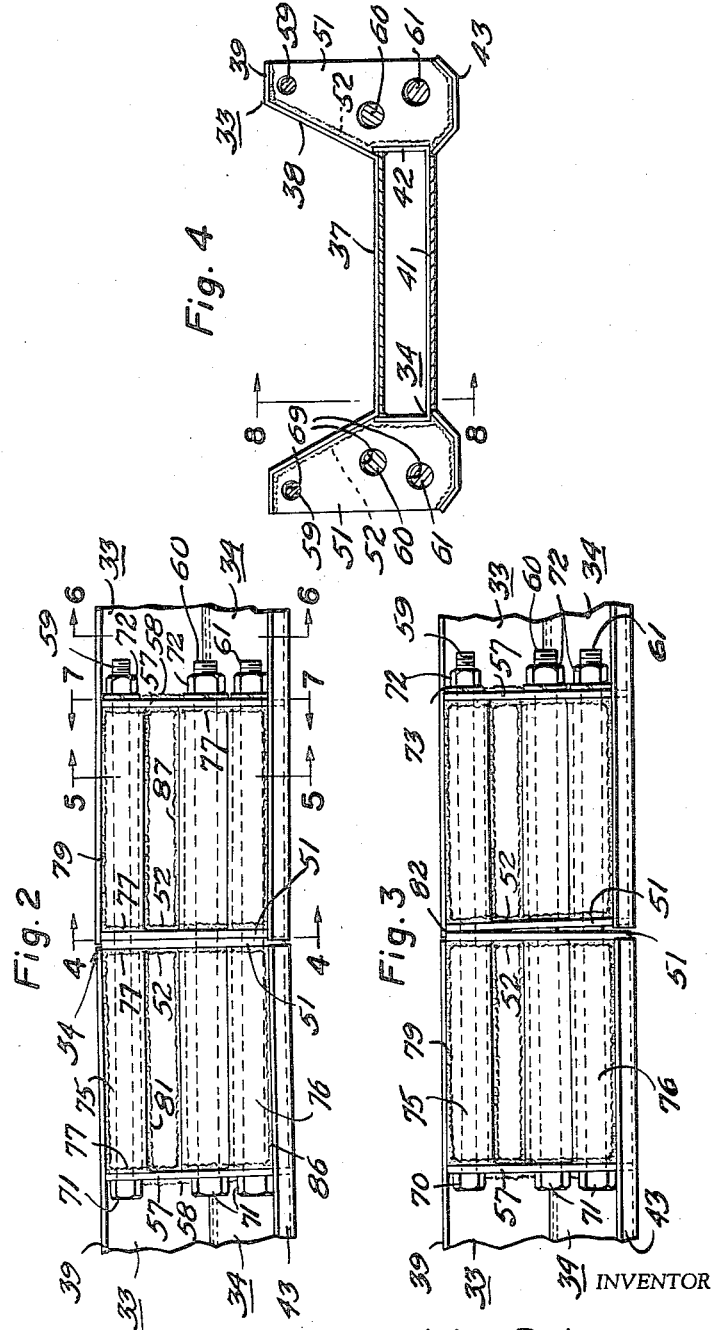
INVENTOR
John B. Long
BY
*Lancaster, Allwine & Rommel*
ATTORNEYS Sept. 30, 1958  J. B. LONG  2,854,129
POWER DRIVEN CONVEYING MECHANISM
Filed April 26, 1956  2 Sheets-Sheet 2
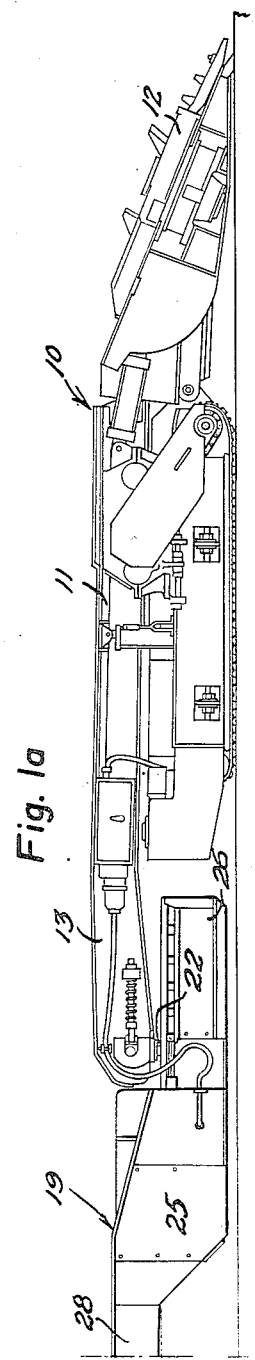
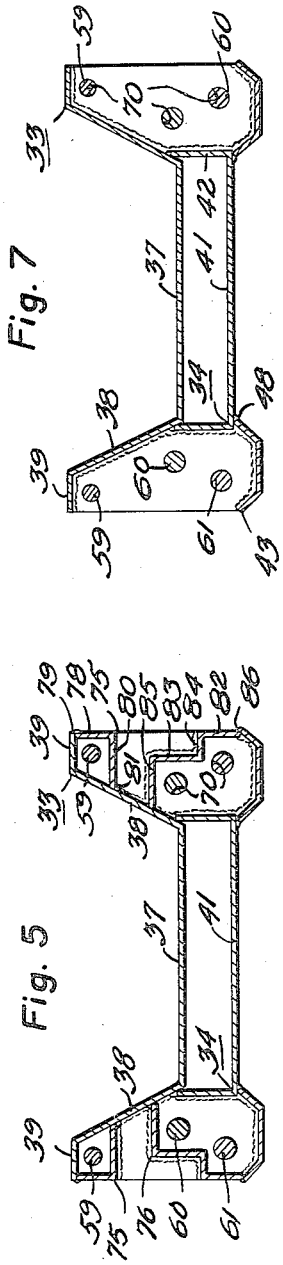
INVENTOR
John B. Long
BY
ATTORNEYS

United States Patent Office 2,854,129
Patented Sept. 30, 1958

2,854,129

POWER DRIVEN CONVEYING MECHANISM

John B. Long, Oak Hill, W. Va., assignor to The Long Company, Oak Hill, W. Va., a corporation of West Virginia Application April 26, 1956, Serial No. 580,841

6 Claims. (Cl. 198—204)

The present invention relates to mechanical loading and transportation of mined material, such as coal, and although particularly useful underground, when working thin seams, is also useful in working thick seams, or even above ground.

Some of the conditions which are met with in the loading and transportation of coal, for instance, from seams as low as twenty-eight to thirty inches, especially where the coal is to be moved by apparatus in a continuous stream from a mobile loading machine, to a room conveyor, by means of an intermediate transfer conveyor, operating between the loading machine and the room conveyor, are the limited space between floor and roof, the uneven characteristics of these natural formations, and the rather limited compass in which workmen must move during the placing, operation and removal of the loading and transportation apparatus.

Apparatus which has been found highly successful in the economical loading and transportation of coal, by way of example, under the adverse conditions above referred to is disclosed in copending application filed by this applicant and Richard J. Frye, December 11, 1950, Serial No. 200,236, for power driven conveying mechanism, now Patent 2,747,721.

One of the principal objects of the present invention is to provide as a part of such mechanism or apparatus, an improved intermediate transfer conveyor, which is relatively long, such as twenty-five feet or more in length, relatively shallow in height, such as around twenty-five inches high, and comparatively slender, such as a maximum width of around thirty-six to thirty-nine inches at its receiving section and around twenty-one to twenty-six inches throughout the major portion of its length; and which intermediate transfer conveyor is comparatively light in weight yet sturdy enough to remain in good repair for a considerable length of time even though subjected to abnormal forces which may come upon it while being moved from place to place in the mine working and especially the abnormal forces which may come upon it while operating for the transportation of the mined material which, by way of example, may be quantities of coal at the rate of from one and three-quarters to four and one-half tons per minute.

As disclosed in the aforesaid Patent 2,747,721, the mechanism or apparatus includes a mobile loading machine provided with a relatively short vertically adjustable boom, in the nature of a power-driven chain discharge conveyor which may be raised and lowered at the will of the operator. The operator's main concern is to keep this loader "in coal," as usually expressed by mining engineers, that is, operating to gather and deliver rearwardly from the face area or "break-through" of the seam, such material as is to be transported through the room, and from there generally deposited in a gathering conveyor. The mechanism or apparatus also includes a room conveyor, generally of the power-driven chain and flight type, comprising a great number of detachable pans or sections, intermediate a head section and a tail section resting on the mine floor. As the mining of the material in the seam progresses to the extent where the tail section is rather remote from the face of the seam, the tail section is detached from the adjacent pan, and moved closer to the face of the seam, and additional pans and chain sections with flights are operatively installed with respect to tail section, and previously installed room conveyor parts. In other words, the room conveyor is extended from time to time as mining of the seam progresses. The mechanism or apparatus also includes the elongated intermediate power-driven transfer conveyor and its novel swivel connections with the short boom discharge conveyor of the mobile loading machine, and a carriage supported by and movable along the receiving conveyor, the arrangement being such that the discharge conveyor of the loading machine, the intermediate transfer conveyor, and the room conveyor are in cascade relationship in the order named. Thus a continuous stream of coal may flow along the intermediate transfer conveyor, from the loading machine to the room conveyor, and the swivel connections allow the loading machine to take various angular positions with respect to the longitudinal axis of the transfer conveyor and the latter may operate above the room conveyor either with its longitudinal axis parallel to or in angular relation to the longitudinal axis of the room conveyor. The transfer conveyor may be moved by the mobile loading machine forwardly and backwardly and to extend in various angular positions with respect to the room conveyor because of the existence of the carriage riding on the room conveyor and the swivel connection between the discharge end of the transfer conveyor and the carriage.

Because of the limited space available between floor and ceiling of the rooms where thin seams are being mined, and the rises and declivities in the mine floors as well as analogous uneven characteristics of the room ceiling, I have discovered that, by making the elongated intermediate transfer conveyor in a manner to comprise a plurality of elongated sections in end-to-end relationship constituting the pans of the conveyor and means elastically connecting these sections in normally arched relationship when unloaded, many objectionable features of an elongated transfer conveyor of the character previously used (which is substantially straight throughout the major portion of its length) are avoided by this yieldable, normally arched condition of the transfer conveyor. For instance, it provides more clearance between the transfer conveyor when the portion at the central zone thereof is over the tail section of the room conveyor, especially when floor surfaces of the room on which the mobile loading machine and the room conveyor tail section rest are inclined toward each other. Likewise if there is a downward dip in the room ceiling, the upwardly arched portion of the transfer conveyor engaging the ceiling temporarily yields toward a substantially straight line condition. Another abnormal condition may be that when a large lump of coal being conveyed by the transfer conveyor either travels or is jarred about to engage a downward dip in the room ceiling—if it is too hard to resist breaking—the transfer conveyor may yield from its normally arched condition until the lump has traveled past the downward dip referred to.

Another object is to provide a transfer conveyor of the character described which is not likely to become sway-backed, due to abnormal forces or loads coming upon it, but if it does become sway-backed, it may readily be rendered normal at a comparatively low cost.

Other objects and advantages will be apparent from the following detailed description of a highly efficient embodiment of the present invention, taken in connection with the accompanying drawings, forming a part of this specification, and in which drawings:

Figs. 1 and 1a constitute a broken view in side elevation of power driven conveying mechanism including an elongated intermediate transfer conveyor of the type embodying the present invention.

Fig. 2 is an enlarged fragmentary view in side elevation of two meeting end portions of pans or sections of the normally arched transfer conveyor, with means connecting such pans or sections in such relationship.

Fig. 3 is a view similar to Fig. 2 but showing the relationship of the pans or sections at said ends when the conveyor is in an abnormal or straight line condition.

Figs. 4, 5, 6 and 7 are transverse sectional views on the lines 4—4, 5—5, 6—6, and 7—7 of Fig. 2.

Fig. 8 is a longitudinal sectional view on the line 8—8 of Fig. 4, through a portion of the transfer conveyor at the meeting end portions of two of the pans or sections, and also showing portions of the upper and lower runs of conveyor chain and flights carried thereby.

In the drawings I disclose a mobile loading machine 10, (Fig. 1a) which may be of any suitable type, including a crawler mounted frame 11, gathering mechanism 12 at the forward end of the frame adapted to gather, in any approved manner, material mined or loosened from the face of the seam, by way of example, and a vertically adjustable boom-type discharge conveyor 13, common in the art of loading and mining machines of the mobile type, extending rearwardly from the frame 11; an elongated room conveyor 14 (Fig. 1) of any approved type, in the example shown, comprising a tail section 15 and several pans, one of which is shown at 16, in line with the tail section 15; a carriage or dolly 17 supported upon and guided longitudinally of the room conveyor 14 in any approved manner, such as that disclosed in the aforesaid Patent 2,747,721; an elongated intermediate transfer conveyor 18 embodying a motorized tail or support end section 19, a plurality of pans or intermediate section 20 and head or support end section 21 which to some extent may also be similar to that disclosed in the aforesaid Patent 2,747,721; a means 22 swiveling the delivery end of conveyor 13 to the receiving end portion of conveyor 18; and means 23 swiveling the delivery end of conveyor 18 upon the carriage 17. As here disclosed and also shown in the Patent 2,747,721, the discharge conveyor 13, the intermediate transfer conveyor 18 and the room conveyor 14 are in cascade relationship in the order named; the tail section 19 embodying a relatively large central portion 25, a low, reduced receiving portion 26 extending from one end of the central portion 25 beneath the free or rearward end portion of the boom-type discharge conveyor 13 to which the swivel means 22 is connected, and an elevated pan-like extension 28 projecting from the other end of the central portion; and, the head section 21 embodying a body portion 30, to which the swivel means 23 is connected, and a short pan-like extension 31.

The pan sections 20, and to some degree, the pan-like extensions 28 and 31 are alike in that they each comprise an upper trough 33, and a parallel lower trough 34 to receive any approved type of endless conveyor chain with flights, or their equivalent, in the usual manner, a section of the upper run and a section of the lower run being shown at 35 and 36, respectively, in Fig. 8. The upper troughs 33 may each comprise a bottom 37, side walls 38 and outwardly extending flanges 39 along the upper edges of the side walls 38. The lower troughs 34 may each comprise a bottom 41, side walls 42 and flanges 43 extending longitudinally of the bottom 41 and projecting outwardly therefrom. If desired, each trough 33 may be fabricated from a single elongated sheet of material with the walls 38 in upwardly diverging planes, as shown in Figs. 4, 5, 6 and 7. The trough 34 may have its bottom 41 and side walls 42 integral and the flanges 43 may each be of rolled trough-like section comprising a bottom 44 and outwardly flaring inner and outer side walls 46 and 47, respectively, with the side walls 47 welded to the bottom 41 as at 48. The upper portions of walls 42 of lower trough 34 may be welded as at 50 to the bottom 37 of its companion upper trough 33.

In the example shown, each pan 20 has its ends defined by end gusset plates 51, which secure the troughs 33 and 34 together as by welds 52 running along the margins of the gusset plate which contact flange 39, walls 38 and 42, and flange 43. These gusset plates 51, as well as the ends of the troughs 33 and 34 are in transverse planes diverging upwardly, or in other words, in planes in obtuse angular relation, (instead of in right angular relation as is the common practice) to the planes of the bottoms of the trough. Thus the pan sections 20, when viewed from the side resemble somewhat a flattened keystone and when the sections 20 are assembled in end-to-end relationship and in engagement with the support end sections 19 and 20, as shown in Fig. 1, with the gusset plates 51 of next adjacent pan sections in surface-to-surface engagement, (also shown in Fig. 2) the assembly is arched and the support end sections 19 and 21 and like "springers" of an arch.

Means 54 is provided for elastically connecting the pan sections in end-to-end relationship, means 55 is provided for elastically connecting the assembly of pan sections 20 to the support end section 19 and means 56 is provided for elastically connecting the assembly of pan sections 20 to the support end section 21. To some extent the means 54, 55 and 56 may be similar in that each may comprise one or more intermediate gusset plates 57 spaced from the end gusset plates 51 a considerable distance, but secured to their respective troughs 33 and 34 by welds 58 in substantially the same manner in which the securing of the end gusset plates 51 to their respective troughs 33 and 34 is accomplished, and relatively long bolts, such as 59, 60 and 61, as to means 54, relatively long bolts 62, 63 and 64 as to means 55 and relatively long bolts 65, 66 and 67 as to means 56. The shanks of these bolts extend through openings 69 in end gusset plates. These openings are each relatively larger in diameter than the diameter of the bolt shank, as shown in Fig. 4. The shanks of the bolts also extend through openings 70 in the intermediate gusset plates 57. The openings 70 may each be of a diameter, about equal to or only slightly larger than the diameter of the bolt which passes therethrough, as shown in Figs. 5 and 7. The heads 71 of the bolts engage certain of the gusset plates and nuts 72 on the bolts are for tensioning the latter in any well known manner, such as by being turned tight against a lock washer 73 for each nut 72 which also engages a gusset plate.

The means 54, 55 and 56 may each also include upper struts 75 and lower struts 76 extending longitudinally of the troughs 33 and 34, between the end and intermediate gusset plates 51 and 57 and secured thereto as by welds 77. The upper struts 75 are each preferably of rolled metal angle stock, one leg 78 of which may be secured, as by weld 79 to the outer margin of its respective flange 39 and extend downwardly therefrom, and the other leg 80 may extend inwardly and be secured to the outer face of its respective wall 38 of the trough 33 as by weld 81. Thus the strut 76 may also function, in association with the trough wall 38 and flange 39 to "box-in" or protect the shank of bolt 59. The lower strut 76 may also be formed of rolled metal angle stock of stepped cross section, in the example shown, including vertical sections 82 and 83, and horizontal sections 84 and 85. The section 82 extends upwardly from the outer margin of flange 43 to which it is secured by weld 86, while the section 85 is horizontally disposed, extending outwardly from wall 38 and secured thereto, as by weld 87 (Fig. 2). In a manner, like struts 75, the struts 76 may also function to "box-in" or protect the shanks of bolts 60 and 61.

In the example shown, it is the elasticity of the relatively long bolts that is depended upon to permit the elongated intermediate transfer conveyor 18 to become temporarily distorted from the arched condition shown in Figs. 1 and 1a to a condition approaching a straight line relationship where the bottoms of the pan sections would be at substantially the dash and double dot line 81, when an excessive force or load comes upon this conveyor unit. The relationship of the pan sections at the joint 57 is shown in Fig. 3 where the ends, such as the gusset plates 51, are separated at their lower ends pivoting about a transverse axis 82, coincident with the upper margins of the gusset plates 51.

In practice I have found that bolts made of medium carbon steel and heat treated to have a yield point between 75 and 90 thousand pounds per square inch and of one inch diameter, with a length of twenty-four inches as a part of the means 54 and 55, and of a length of thirteen inches as a part of the means 56 when used with an arched transfer conveyor 18 having a span of approximately twenty-three feet between supports and having a total weight of approximately 3500 lbs., will function to hold the parts together and produce the desired results of arch and resilience in use.

The upper bolts 59, 62 and 65 may each be of a diameter less than the diameter of any of the bolts 60, 61, 63, 64, 66 and 67 because the former are substantially out of the tensile stress zone.

The preferred construction of the transfer conveyor 18 herein disclosed, is light in weight, and sturdy. This is important since in practice this unit 18 is carried as an overhung load by the loading machine 10 and supported by light weight conveyor pans 16, through a shallow carriage 17. If the bolts of any of the means 54, 55 and 56 take a permanent set in stretched condition, due to excessive loads coming upon the conveyor 18, so that it becomes normally sagged or sway-backed, these bolts may readily be replaced, something which would not remedy the sagging or sway-backed condition of the transfer conveyor shown in the aforesaid Patent 2,747,721 where relatively short bolts are used to connect the pan sections and where the pan ends are in planes at right angles to the longitudinal axes of the pan sections.

I claim:

1. In a conveyor unit, the combination of spaced apart support end sections; a plurality of elongated pan sections having ends in transverse planes diverging upwardly, means elastic in directions substantially normal to said planes connecting said pan sections in abutting end-to-end relationship at said planes to form a substantially arched assembly, and means connecting the ends of said arched assembly to said support end sections whereby a force or load coming upon the said conveyor unit between said support end sections may cause temporary distortion of said arched assembly toward straight line relationship of the pan sections, but capable of resuming an arched condition, when relieved of said force or load.

2. The combination as specified in claim 1 in which said pan sections each comprises an upper trough, a lower trough, said troughs in parallel relationship, and companion spaced apart, upright end and intermediate gusset plates securing said troughs together at each of their end portions, said end gusset plates lying in planes crosswise of the pan section and in upwardly diverging relation, and said first means includes said gusset plates and long bolts, the shanks of which extend continuously through the intermediate and end gusset plates of the adjacent abutting ends of the pan sections.

3. The combination as specified in claim 2 in which said upper trough of each pan section comprises a bottom, side walls, and flanges along the upper portions of said walls, extending outwardly therefrom, said lower trough of each pan section comprises a bottom, side walls and flanges extending longitudinally of the bottom and extending outwardly therefrom, and said end and intermediate gusset plates are secured to said flanges and side walls of said upper and lower troughs.

4. The combination as specified in claim 3 in which struts, extend longitudinally of the troughs, between said end and intermediate gusset plates and are secured to said walls and flanges of said troughs.

5. The combination as specified in claim 4 in which said struts are angular in cross section and arranged to conceal the shanks of said bolts, between said end and intermediate gusset plates.

6. In apparatus particularly well adapted for loading and conveying material mined from thin seams where the distance between the floor and roof in underground workings is limited, of the class comprising a mobile loading machine adapted to be moved about on the floor of the mine working and including a vertically adjustable discharge conveyor, an elongated intermediate transfer conveyor, and an elongated receiving conveyor adapted to rest upon the mine floor, said conveyors having their adjacent ends in cascade relationship in the order named, a carriage supported by and movable along said receiving conveyor, means swiveling the delivery end of said intermediate transfer conveyor upon said carriage and means swiveling the receiving end of said intermediate conveyor to and beneath said vertically adjustable discharge conveyor whereby the intermediate transfer conveyor is raised and lowered simultaneously with upward and downward adjustment, respectively, of said discharge conveyor, and the intermediate transfer conveyor is moved forwardly and backwardly with respect to and above said receiving conveyor as said mobile loading machine is moved forwardly and backwardly, respectively; the improvement which comprises forming said elongated intermediate transfer conveyor to comprise elongated pan sections in end-to-end relationship, and means resiliently connecting said pan sections of said intermediate transfer conveyor in normally arched relationship, and capable of yielding to permit the said pan sections to temporarily move toward a substantially straight line relationship when an excessive load is imposed upon said elongated intermediate transfer conveyor or the normally arched intermediate transfer conveyor is pressed against the ceiling of the room during movement of the apparatus from place to place in the mine.

References Cited in the file of this patent

UNITED STATES PATENTS 2,420,085     Long _____ May 6, 1947

FOREIGN PATENTS 494,275     Canada _____ July 7, 1953